(12) United States Patent
Tischer et al.

(10) Patent No.: US 7,693,741 B2
(45) Date of Patent: *Apr. 6, 2010

(54) METHODS FOR PROVIDING COMMUNICATIONS SERVICES

(75) Inventors: Steven N. Tischer, Atlanta, GA (US); Jerry C. Liu, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/323,690

(22) Filed: Dec. 30, 2005

(65) Prior Publication Data

US 2006/0111079 A1 May 25, 2006

Related U.S. Application Data

(63) Continuation-in-part of application No. 10/720,946, filed on Nov. 24, 2003.

(51) Int. Cl.
*G06Q 99/00* (2006.01)

(52) U.S. Cl. .................. 705/10; 705/1.1; 705/38; 705/56; 709/227; 455/405; 455/406; 455/434; 707/10

(58) Field of Classification Search .......... 705/1, 705/38, 80, 37, 1.1; 455/405–406, 456.1, 455/434; 370/352
See application file for complete search history.

(56) References Cited

U.S. PATENT DOCUMENTS

| | | | |
|---|---|---|---|
| 5,752,186 A | 5/1998 | Malackowski et al. | |
| 5,790,176 A | 8/1998 | Craig | |
| 5,862,471 A * | 1/1999 | Tiedemann et al. | 455/406 |
| 5,978,780 A | 11/1999 | Watson | |
| 6,002,689 A | 12/1999 | Christie | |
| 6,016,307 A | 1/2000 | Kaplan | |
| 6,058,301 A * | 5/2000 | Daniels | 455/411 |
| 6,104,718 A | 8/2000 | Christie | |
| 6,178,170 B1 | 1/2001 | Duree | |
| 6,272,343 B1 * | 8/2001 | Pon et al. | 455/434 |
| 6,285,871 B1 | 9/2001 | Daniels | |
| 6,385,198 B1 | 5/2002 | Ofek | |
| 6,456,594 B1 | 9/2002 | Kaplan | |
| 6,516,194 B2 | 2/2003 | Hanson | |

(Continued)

FOREIGN PATENT DOCUMENTS

WO    WO 00/41426    7/2000

(Continued)

OTHER PUBLICATIONS

O,Connell, Brian, Around the World With Global Networks, Oct. 1993, DEC Professional, v12, n10, p. 38(5 pgs).*

*Primary Examiner*—John W Hayes
*Assistant Examiner*—Freda Ann Nelson
(74) *Attorney, Agent, or Firm*—Scott P. Zimmerman PLLC

(57) ABSTRACT

Methods, systems, and products are disclosed for providing communications services. One method receives a request for communications service. The request for communications service originates from a client communications device, and the request for communications service is communicated to a service provider of a communications network. A preferred scenario of segmentation, dispersion, and assemblage of electronic data is dynamically ascertained to fulfill the request. The method then bills for the communications service.

20 Claims, 14 Drawing Sheets

U.S. PATENT DOCUMENTS

| | | |
|---|---|---|
| 6,519,693 B1 | 2/2003 | Debey |
| 6,522,883 B2 | 2/2003 | Titmuss |
| 6,567,375 B2 | 5/2003 | Balachandran et al. |
| 6,697,806 B1* | 2/2004 | Cook .......................... 707/10 |
| 6,934,530 B2 | 8/2005 | Engelhart |
| 7,043,225 B1* | 5/2006 | Patel et al. .................. 455/405 |
| 7,155,517 B1 | 12/2006 | Koponen |
| 2001/0029544 A1 | 10/2001 | Cousins |
| 2002/0058532 A1* | 5/2002 | Snelgrove et al. ........... 455/557 |
| 2002/0087674 A1 | 7/2002 | Guilford |
| 2002/0112060 A1* | 8/2002 | Kato .......................... 709/227 |
| 2002/0138398 A1* | 9/2002 | Kalin et al. .................. 705/37 |
| 2002/0138418 A1* | 9/2002 | Zarin et al. .................. 705/38 |
| 2002/0164018 A1 | 11/2002 | Wee |
| 2002/0176378 A1 | 11/2002 | Hamilton |
| 2003/0012376 A1 | 1/2003 | Wee |
| 2003/0043815 A1 | 3/2003 | Tinsley |
| 2003/0088778 A1 | 5/2003 | Lindqvist |
| 2003/0093550 A1 | 5/2003 | Lebizay |
| 2003/0143978 A1* | 7/2003 | Cooper et al. ............... 455/406 |
| 2003/0211856 A1 | 11/2003 | Zilliacus |
| 2004/0249927 A1 | 12/2004 | Pezutti |
| 2005/0025124 A1* | 2/2005 | Mitsumori et al. .......... 370/352 |
| 2005/0038637 A1 | 2/2005 | Balakrishnan |
| 2005/0094725 A1 | 5/2005 | Hui |
| 2006/0041679 A1 | 2/2006 | Feig |
| 2007/0203844 A1* | 8/2007 | Kuhn et al. .................. 705/56 |
| 2007/0299771 A1* | 12/2007 | Brody et al. ................. 705/38 |

FOREIGN PATENT DOCUMENTS

WO     WO 0041426 A1 * 7/2000

* cited by examiner

METHODS FOR PROVIDING COMMUNICATIONS SERVICES

CROSS-REFERENCE TO RELATED APPLICATIONS

This application is a continuation-in-part of U.S. application Ser. No. 10/720,946, filed Nov. 24, 2003 and entitled "Methods for Providing Communications Services" and incorporated herein by reference. This application also relates to the following co-pending and commonly assigned applications, all of which are incorporated herein by reference: U.S. application Ser. No. 10/720,941, entitled "Methods for Providing Communications Services"; U.S. application Ser. No. 10/720,949, entitled "Methods for Providing Communications Services"; U.S. application Ser. No. 10/720,586, entitled "Methods for Providing Communications Services"; U.S. application Ser. No. 10/720,800, entitled "Methods for Providing Communications Services"; U.S. application Ser. No. 10/720,720, entitled "Methods for Providing Communications Services"; U.S. application Ser. No. 10/720,956, entitled "Methods for Providing Communications Services"; U.S. application Ser. No. 10/720,587, entitled "Methods for Providing Communications Services"; and U.S. application Ser. No. 10/720,892, entitled "Methods for Providing Communications Services".

NOTICE OF COPYRIGHT PROTECTION

A portion of the disclosure of this document and its figures contain material subject to copyright protection. The copyright owner has no objection to the facsimile reproduction by anyone of the document, but otherwise reserves all copyrights whatsoever.

BACKGROUND

The exemplary embodiments generally relate to computers and to communications and, more particularly, to processing data in a communications network.

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

SUMMARY

The aforementioned problems, and other problems, are reduced by methods, computer systems, computer programs, and computer program products that provide communications services. Exemplary embodiments manage optimum routing scenarios amongst various and multiple communications networks. These various and multiple communications networks, however, may utilize dissimilar billing scenarios. Each time a user requires communications service, exemplary embodiments analyze the user's communications needs to determine available network routing, network bandwidth, speed, the capabilities of the client communications device, and the availability of multi-grid assets (such as reassembly and delivery capabilities of edge assemblers in any of the communications networks). Once the communications path(s) and communications networks are determined for data segmentation, manipulation, and aggregation, exemplary embodiments manage how each of the communications networks bill and/or collect payment for the provided communications service(s). Because exemplary embodiments are dynamic, the billing scheme may change each time communications services are provided.

Exemplary embodiments disclose methods, systems, and products for providing communications services. One of the embodiments describes a method for providing communications services. This method receives a request for communications service. The term "communications service" means uploading and/or downloading data and/or voice signals via a communications network. The request for communications service originates from a client communications device, and the request for communications service is communicated to a service provider of a communications network. A preferred scenario of segmentation, dispersion, and assemblage of electronic data is dynamically ascertained to fulfill the request. The method then bills for the communications service.

Another of the embodiments describes a system for providing communications services. The system includes an analysis module stored in a memory device, and a processor communicates with the memory device. The analysis module receives a request for communications service. The request for communications service originates from a client communications device and is communicated to a service provider of a communications network. The analysis module dynamically ascertains a preferred scenario of segmentation, dispersion, and assemblage of electronic data to fulfill the request. The analysis module then bills for the communications service.

Other exemplary embodiments describe a computer program product. A computer-readable medium stores an analysis module. The analysis module receives a request for communications service. The request for communications service originates from a client communications device and is communicated to a service provider of a communications network. The analysis module dynamically ascertains a preferred scenario of segmentation, dispersion, and assemblage of electronic data to fulfill the request. The analysis module then bills for the communications service.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These exemplary embodiments are provided so that this disclosure will be thorough and complete and will fully convey to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by any. Those of ordinary skill in the art further understand that the exemplary hardware, software, processes, methods, and/or operating systems described herein are for illustrative purposes and, thus, are not intended to be limited to any particular named manufacturer.

Figure 1:
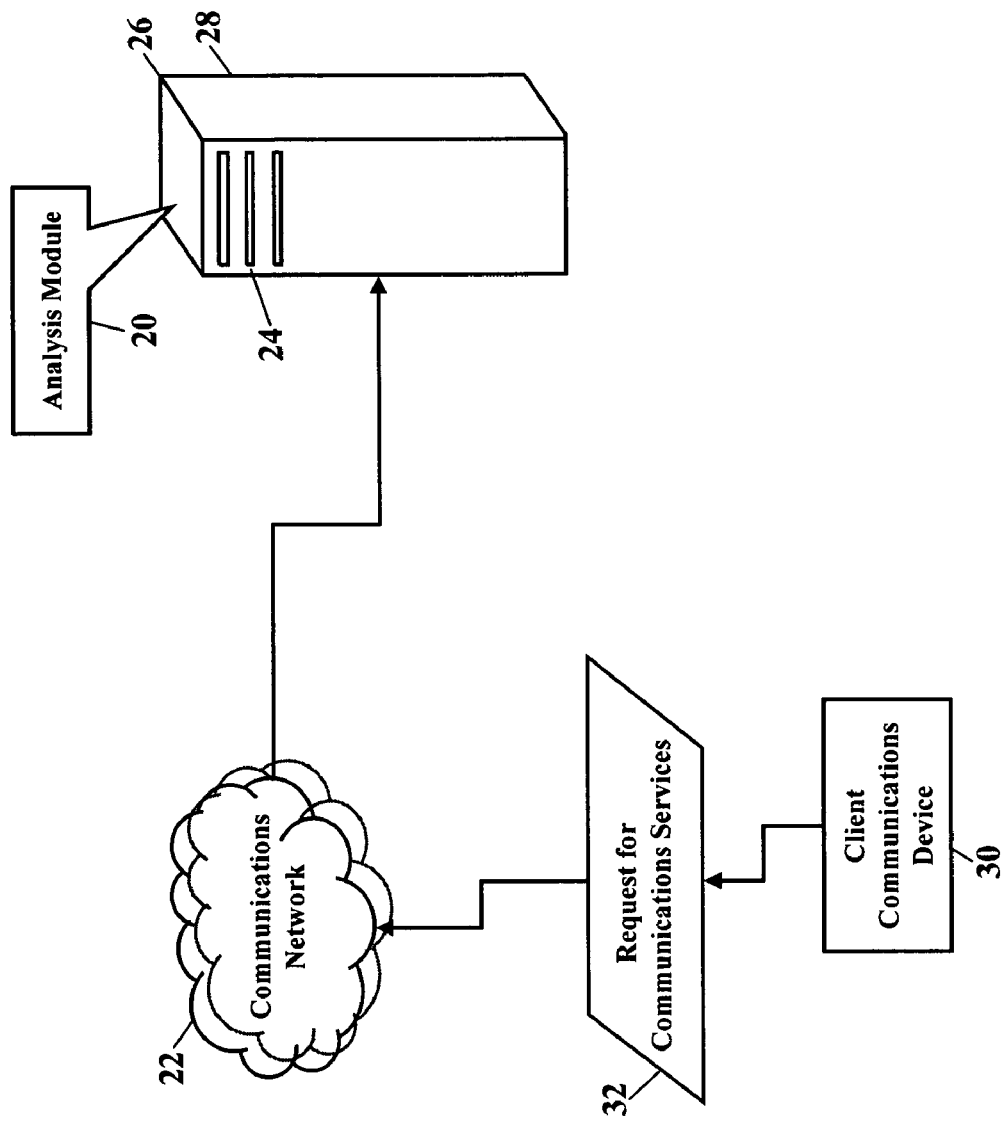
FIG. 1 is a schematic illustrating an analysis module, according to exemplary embodiments.

FIG. 1 is a schematic illustrating an analysis module 20, according to exemplary embodiments. The analysis module 20 manages optimum routing scenarios amongst various and multiple communications networks. These various and multiple communications networks, however, may utilize dissimilar billing scenarios. The analysis module 20 operates within a communications network 22. This communications network 22 represents just one of the possible operating environments for the analysis module 20. The analysis module 20 is stored within memory 24 of a computer device 26, such as a service provider's computer server 28 communicating with the communications network 22. When a user, using a client communications device 30, requires communications service, the client communications device 30 communicates a request 32 for communications service. The term "communications service" means uploading and/or downloading data via the communications network 22. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others.

The request 32 for communications service is received by the analysis module 20 via the communications network 22. The analysis module 20 analyzes the user's communications needs to determine what data is requested, what network routing is available, how much network bandwidth is available, the speed at which the requested communications service(s) is required, and the capabilities of the client communications device 30. The analysis module 20, however, also analyzes the availability of multi-grid assets (such as the availability of routing/bandwidth of other communications networks and the reassembly and delivery capabilities of edge assemblers in any of these available communications network). Once the available communications path(s) and communications networks are determined, the analysis module 20 determines how data should be segmented, manipulated, dispersed, and aggregated to fulfill the request 32 for communications service.

Figure 2:
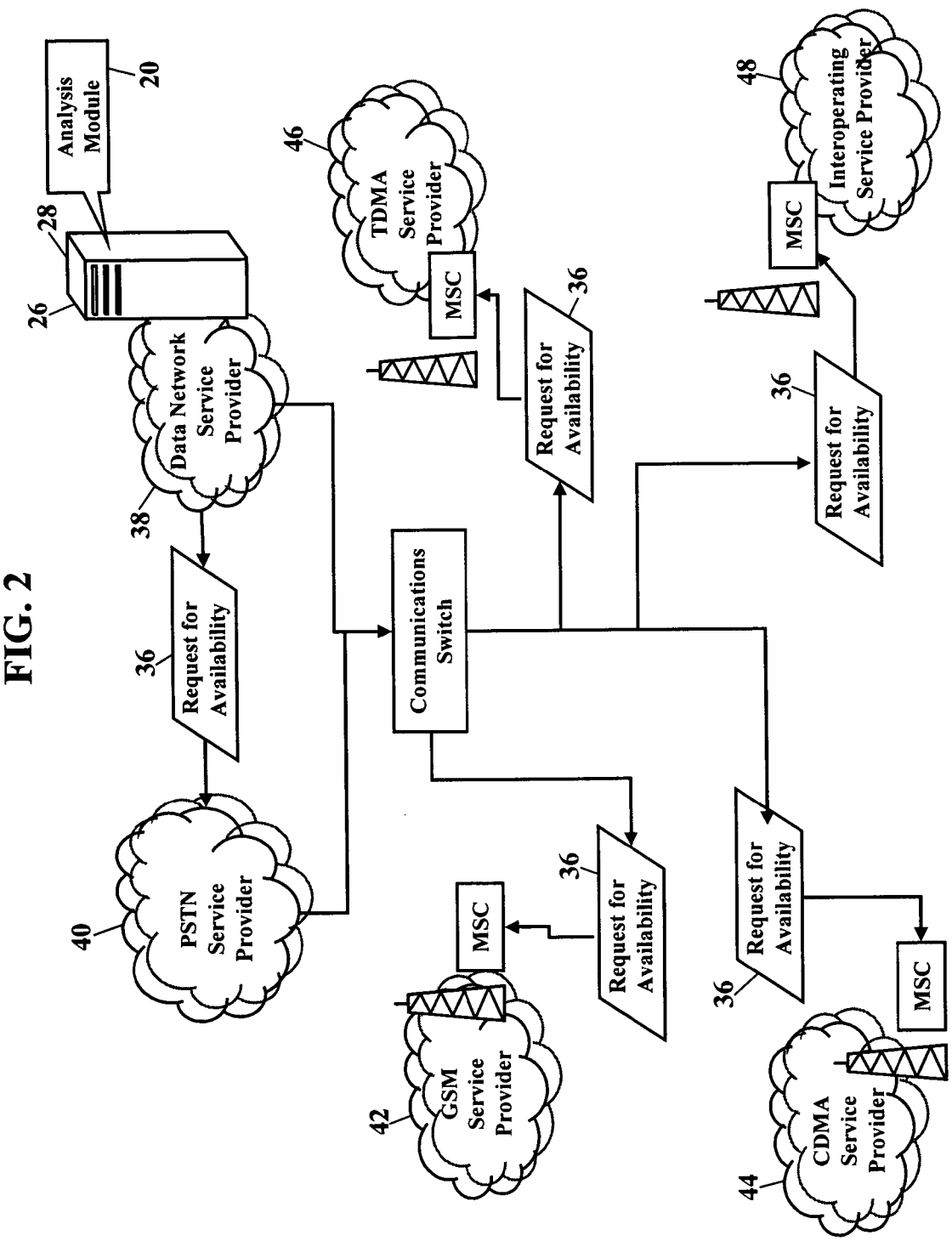
FIGS. 2 and 3 are schematics illustrating the multi-grid assets, according to more exemplary embodiments.
Figure 3:
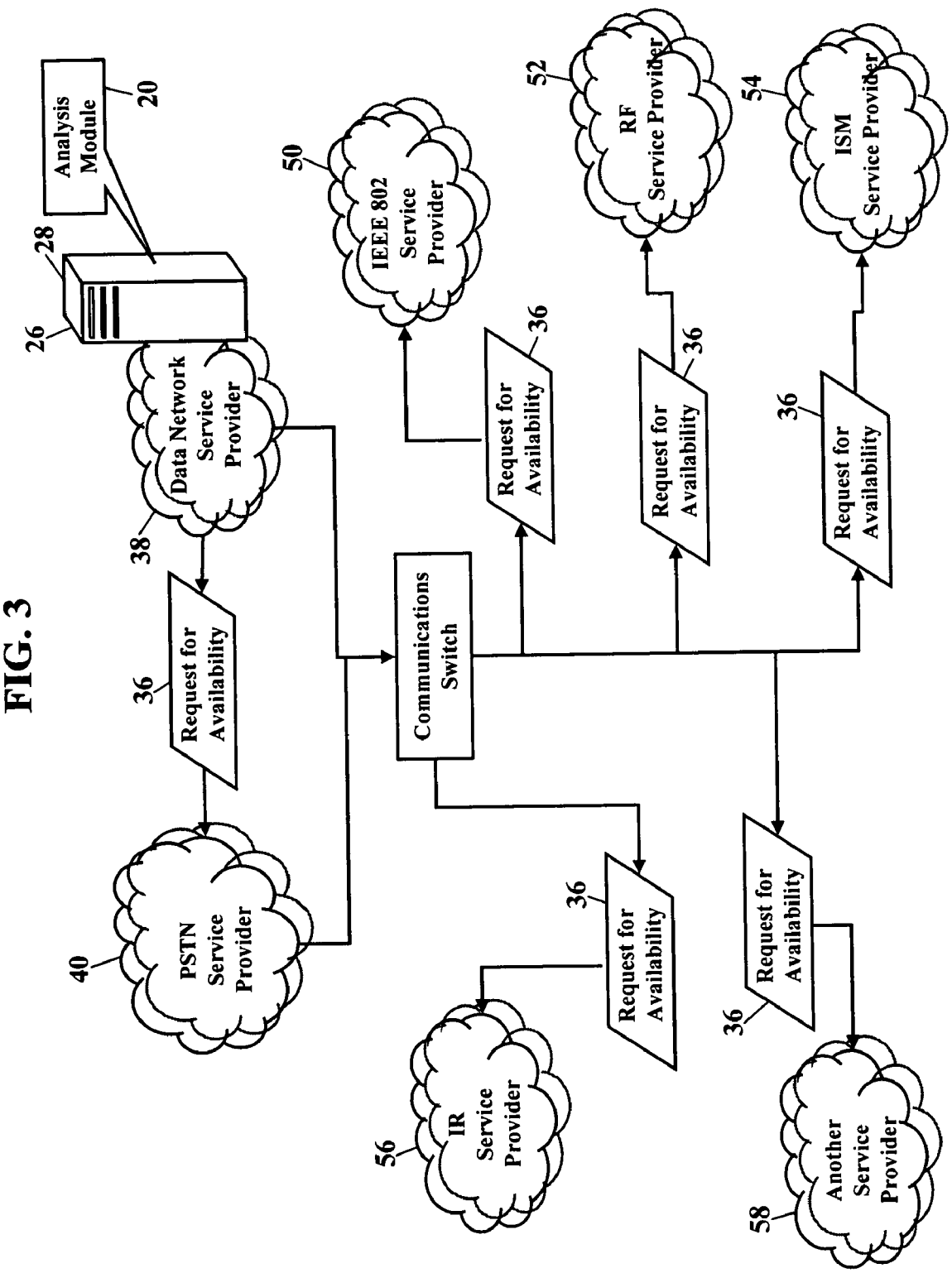

FIGS. 2 and 3 are schematics illustrating the multi-grid assets, according to more exemplary embodiments. When the client communications device (shown as reference numeral 30 in FIG. 1) requires communications service, the analysis module 20 analyzes the availability of one or multiple communications networks. The analysis module 20 communicates a request 36 for availability to other wireline and/or wireless communications networks. The request 36 for availability communicates from the analysis module 20 to one or more service providers of one or multiple communications networks. FIG. 2, for example, shows the analysis module 20 communicating the request 36 for availability to a data network 38 and/or the Public Switched Telephone Network 40. The analysis module 20 may also communicate the request 36 for availability to a GSM cellular network 42, a CDMA cellular network 44, a TDMA cellular network 46, and a GSM/CDMA/TDMA interoperating network 48 (such as a GSM-ANSI Interoperability Team (GAIT) network). As those of ordinary skill in the art recognize, the GSM cellular network 42 operates using the Global System for Mobile (GSM) communications technology standard, the CDMA cellular network 44 operates using a Code Division Multiple Access (CDMA) communications technology standard, and the TDMA cellular network 46 operates using a Time Division Multiple Access (TDMA) communications technology standard. Those of ordinary skill in the art also recognize that the GSM/CDMA/TDMA interoperating network 48 may operate using a GSM-ANSI Interoperability Team (GAIT) communications technology standard, a combination CDMA/GSM technology standard, and/or a combination TDMA/CDMA technology standard. FIG. 3, similarly, shows the analysis module 20 initiating the request 36 for availability to an I.E.E.E. 802 wireless network 50, an RF wireless network 52, an ISM wireless network 54, an IR wireless network 56, and another wireless network 58. The I.E.E.E. 802 wireless network 50 utilizes any of the I.E.E.E 802 family of wireless technology standards. The RF wireless network 52 uses the radio frequency (RF) portion of the electromagnetic spectrum, the ISM wireless network 54 uses the Industrial, Scientific, and Medical (ISM) band of the electromagnetic spectrum, the IR wireless network 56 uses the infrared (IR) portion of the electromagnetic spectrum, and the another wireless network 58 utilizes any other portion/frequency within the electromagnetic spectrum.

Figure 4:
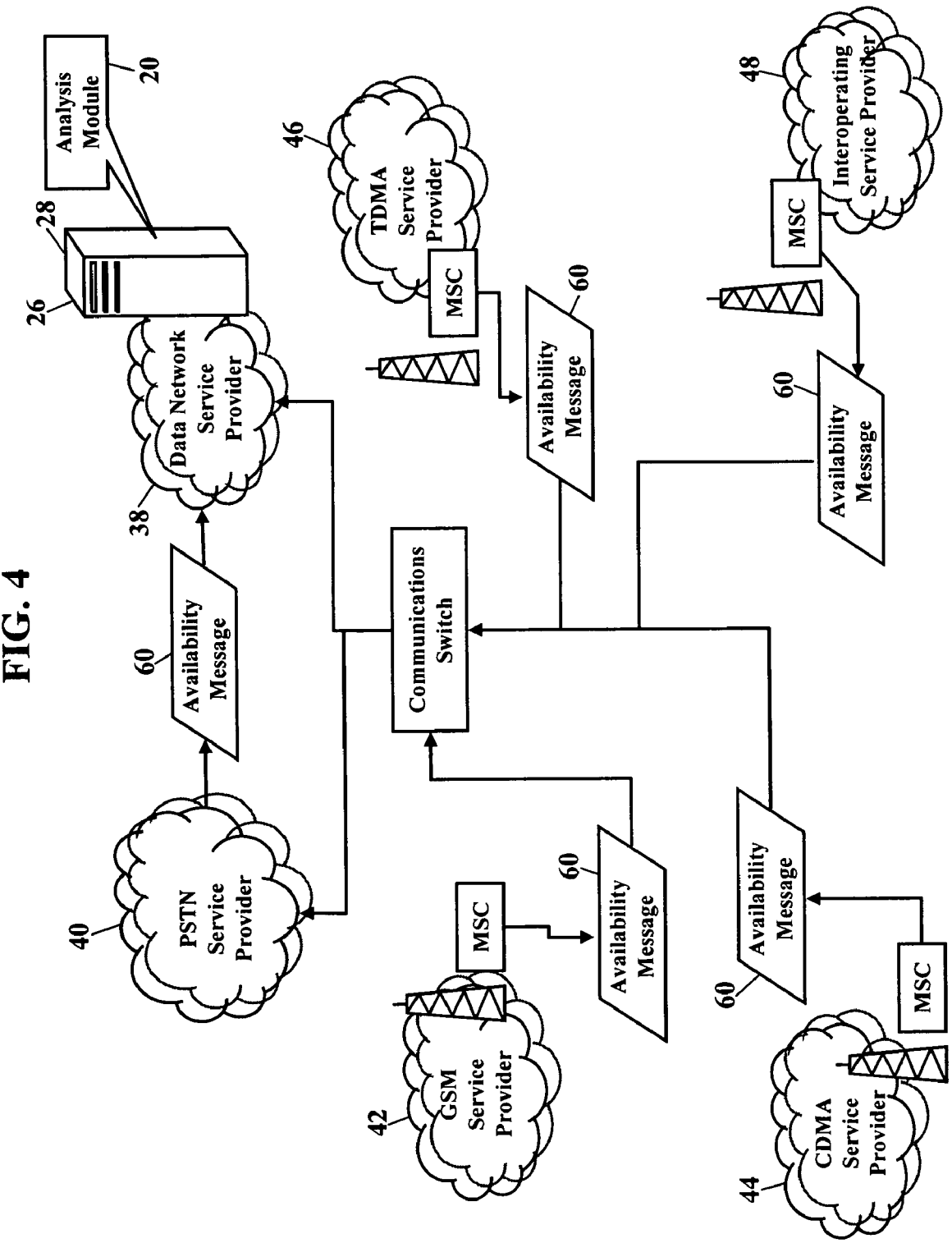
FIGS. 4 and 5 are schematics illustrating the availability of the multi-grid assets, according to still more exemplary embodiments.
Figure 5:
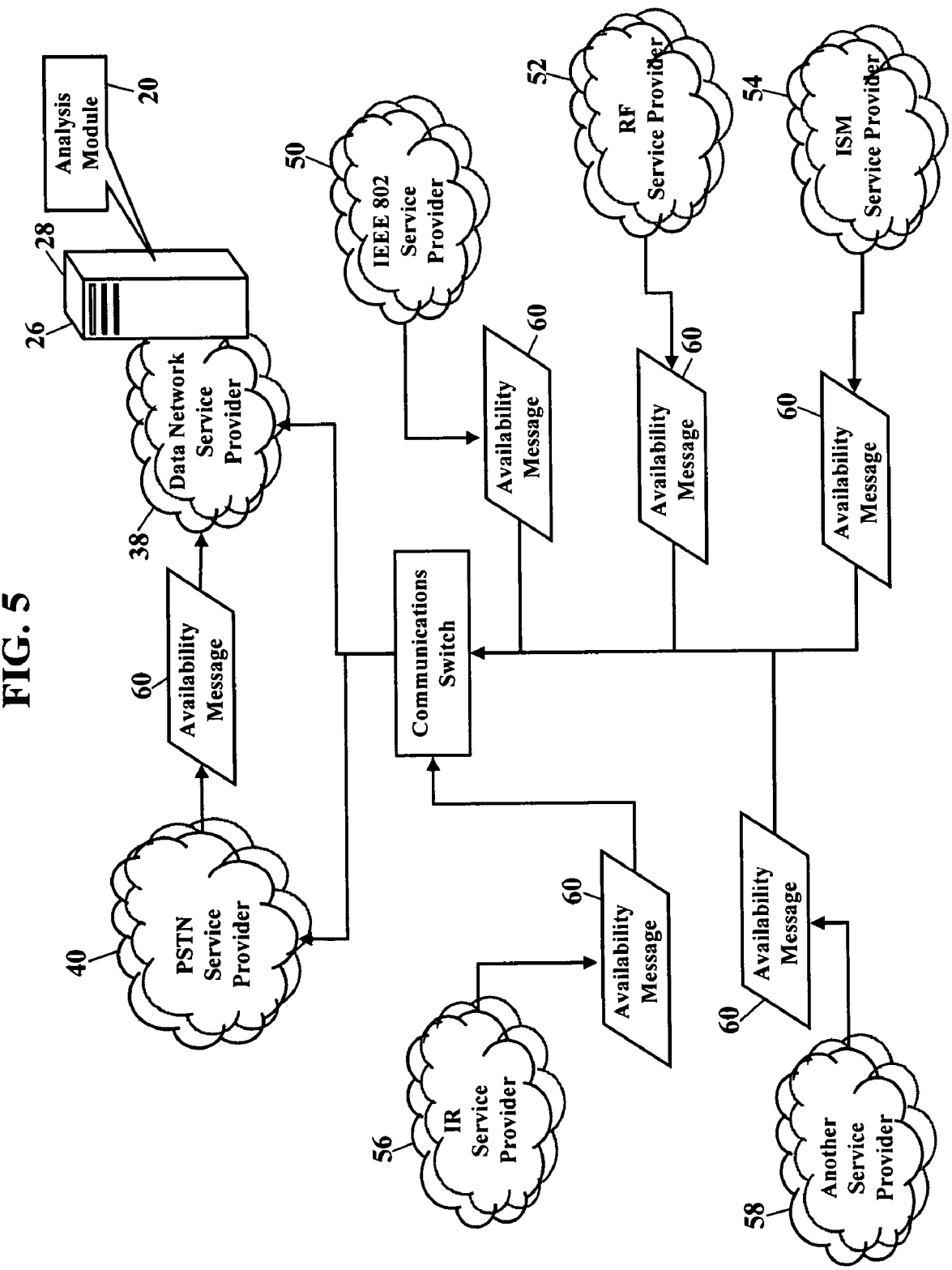

FIGS. 4 and 5 are schematics illustrating the availability of the multi-grid assets, according to still more exemplary embodiments. When the other wireline and/or wireless communications networks receive the request for availability (shown as reference numeral 36 in FIGS. 2 and 3), each communications network return communicates an availability message 60. The availability message 60 communicates from the one or more service providers of one or multiple communications networks to the analysis module 20. Each availability message 60 includes what routing paths are immediately available within the respective communications network, and what bandwidth is immediately available along each routing path. Each availability message 60 may also include the immediate reassembly and delivery capabilities of any edge assemblers within the respective communications network. Each availability message 60, however, may also include alternative availabilities. These alternative availabilities might include suggestions for cheaper rates, better performance, and/or higher quality communications services. If, for example, the user's communications needs are not immediate, a service provider might suggest an alternative time/date when better communications services are available. A service provider might suggest greater bandwidth is available during off-peak times. A cheaper rate might be available between midnight and 6 AM. A service provider might also offer greater bandwidth, perhaps with less probability of loss and/or distortion, if a slightly higher price is paid. Whatever the service provider's alternative suggestions, the analysis module 20 receives and analyzes each availability message 60.

Figure 6:
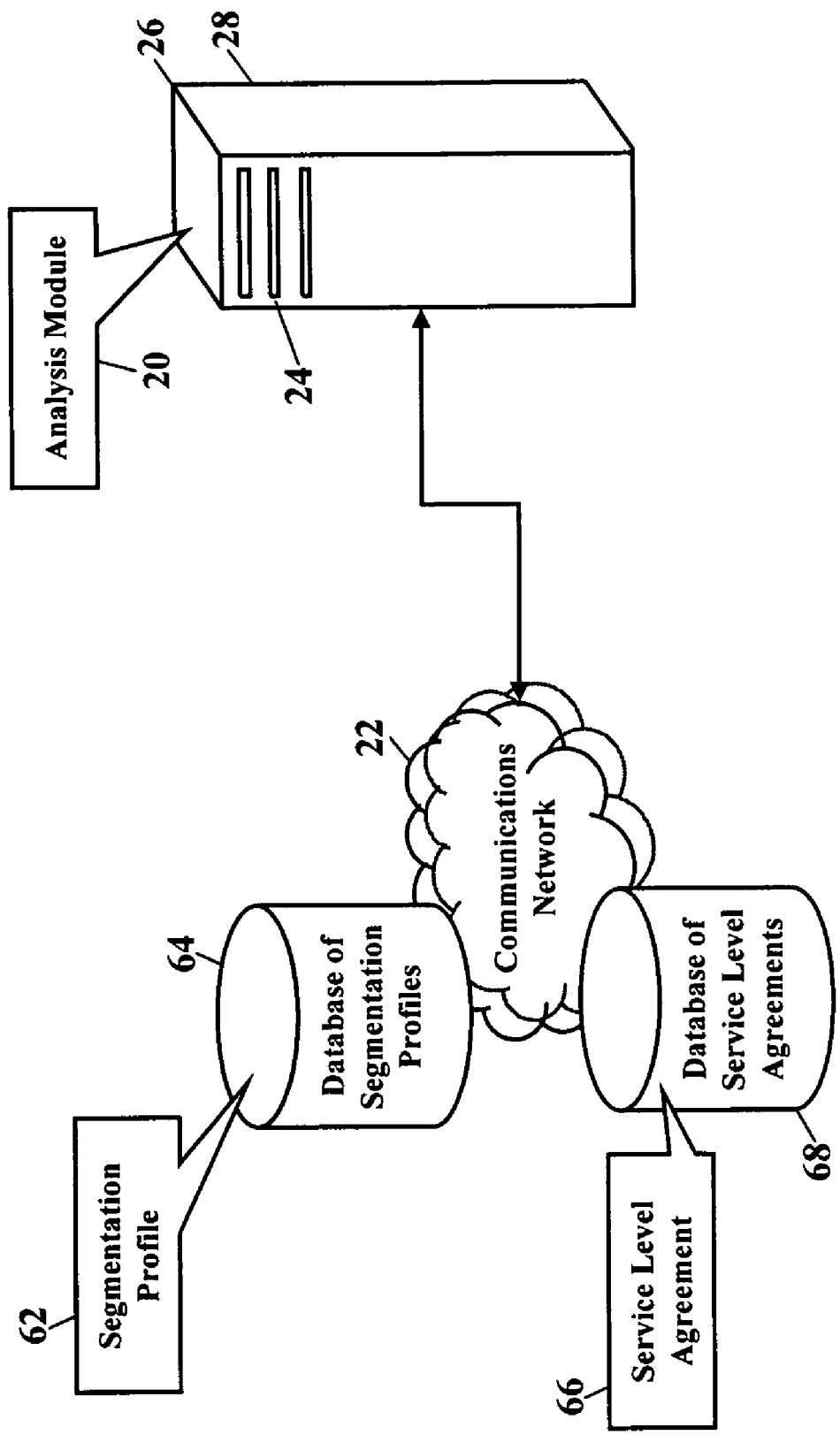
FIG. 6 is a schematic illustrating a segmentation profile and a Service Level Agreement, according to even more exemplary embodiments.

FIG. 6 is a schematic illustrating a segmentation profile 62 and a Service Level Agreement 66, according to even more exemplary embodiments. When the analysis module 20 receives each availability message (shown as reference numeral 60 in FIGS. 4 and 5), the analysis module 20 dynamically ascertains a preferred scenario of segmentation, dispersion, and assemblage of electronic data. The analysis module 20 analyzes each availability message, and the analysis module 20 determines how data should be optimally segmented, dispersed, manipulated, and then reassembled to fulfill the request for communications service (shown as reference numeral 32 in FIG. 1). The preferred scenario reflects the best-available routing, and/or the best-available transformation/formatting, that provides the requested communications service(s). When the analysis module 20 constructs the preferred scenario, the analysis module 20 may determine that competing communications networks, and/or competing service providers, offer advantageous quality, performance, and/or pricing. The analysis module 20 may dynamically negotiate amongst other service providers to fulfill the request for communications service.

The analysis module 20 may access a segmentation profile 62. The segmentation profile 62 is stored/maintained within a database 64 of segmentation profiles, and the segmentation profile 62 may contain preferences for preferring one service provider to another service provider. The segmentation profile 62 may alternatively or additionally contain preferences for preferring one communications network to another communications network. The segmentation profile 62 may alternatively or additionally contain preferences for preferring a highest-rated, or higher-rated, service provider to provide the communications service. That is, if an auction community provides ratings feedback, the segmentation profile 62 and/or the analysis module 20 may prefer higher/highest-rated service providers and/or higher/highest-rated communications networks.

The analysis module 20 may access a Service Level Agreement 66. The Service Level Agreement 66 is stored/maintained within a database 68 of Service Level Agreements. The Service Level Agreement 66 is an agreement defining one or more parameters for the communications service(s) provided on behalf of the user. The Service Level Agreement 66 may be an agreement by and between the user and a service provider. The Service Level Agreement 66 defines how the user wishes to receive data, in what format that data is delivered, when the data is delivered, and to what device (or along what network path) that data is delivered. The Service Level Agreement 66 might define pricing for various bandwidth needs, network utilization, delivery times, and processing charges. Because Service Level Agreements are, in general, known in the art, and because the content of the Service Level Agreement 66 may greatly vary, this patent will not further explain the Service Level Agreement 66.

Once the preferred scenario is known, the analysis module 20 then determines billing. Because the preferred scenario may utilize multiple communications networks, and perhaps even competing service providers of other communications networks, billing relationships may not be established. As those of ordinary skill in the art recognize, competing service providers may have dissimilar billing schemes, and these dissimilar billing schemes may not be immediately ascertainable. The analysis module 20, then, may determine and assemble billing rates amongst multiple communications networks and/or amongst competing service providers. The analysis module 20, additionally or alternatively, may access the segmentation profile 62 and/or the Service Level Agreement 66. The segmentation profile 62 may also contain preferences for billing for the communications service, and the segmentation profile 62 may also contain preferences for presenting billing charges from another service provider of another communications network. The Service Level Agreement 66, likewise, may contain/define preferences for billing for the communications service. The analysis module 20 preferably determines the billing relationships and calculates rates/charges before providing the requested communications service. The analysis module 20, however, may alternatively authorize/provide the requested communications service before the billing relationships and/or rates/charges are known.

Figure 7:
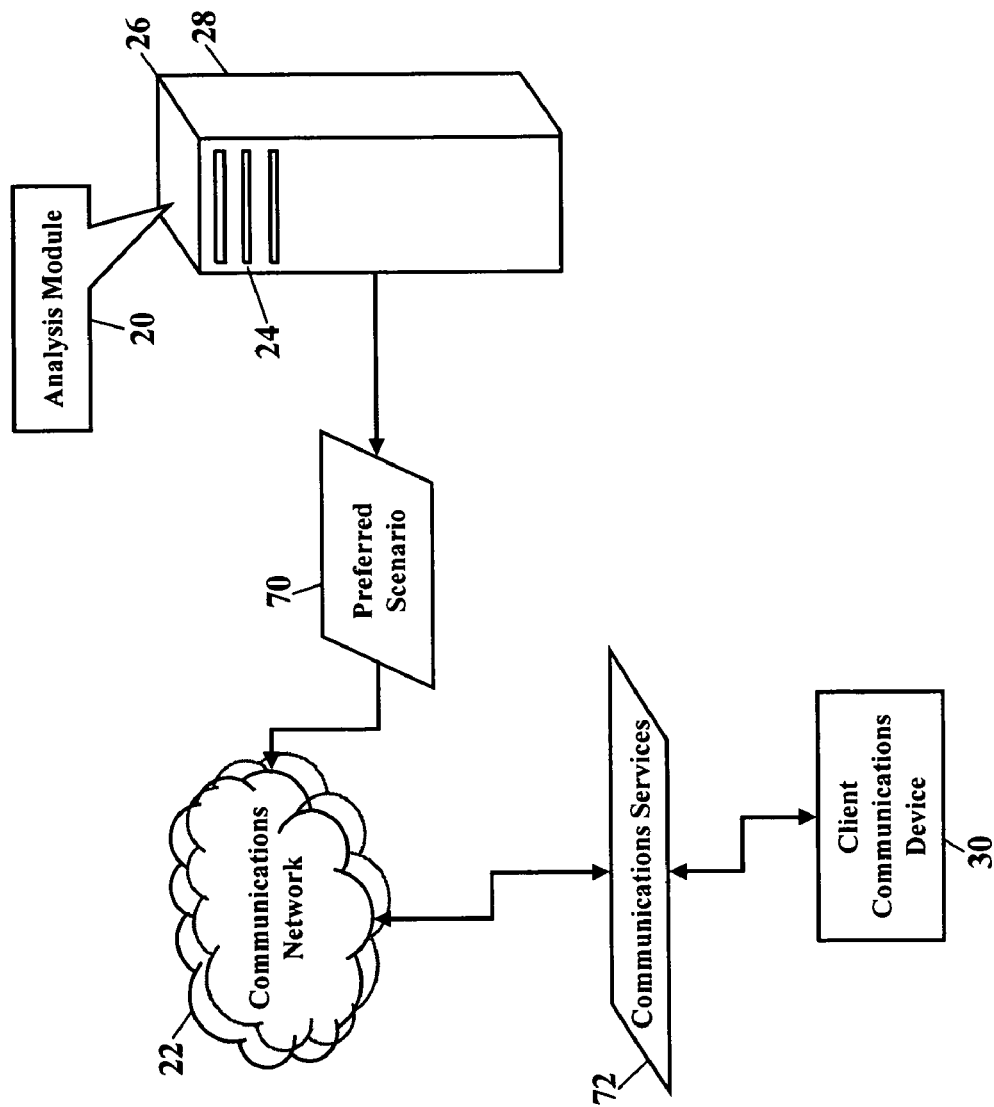
FIG. 7 is a schematic illustrating exemplary embodiments.

FIG. 7 is a schematic illustrating the preferred scenario 70. The analysis module 20 determines how data is optimally segmented, dispersed, manipulated, and then reassembled to fulfill the request for communications service (shown as reference numeral 32 in FIG. 1). The preferred scenario 70 reflects the best-available routing, and/or the best-available transformation/formatting, that provides the requested communications service(s). The preferred scenario 70 may include instructions/commands to other computer devices to provide the requested communications service according to the preferred scenario. The preferred scenario 70 may also include reservations that instruct computer devices to expect certain data and/or to open/reserve routing links/channels. After the preferred scenario 70 is known, the requested communications service 72 is then provided to the client communications device 30.

Figure 8:
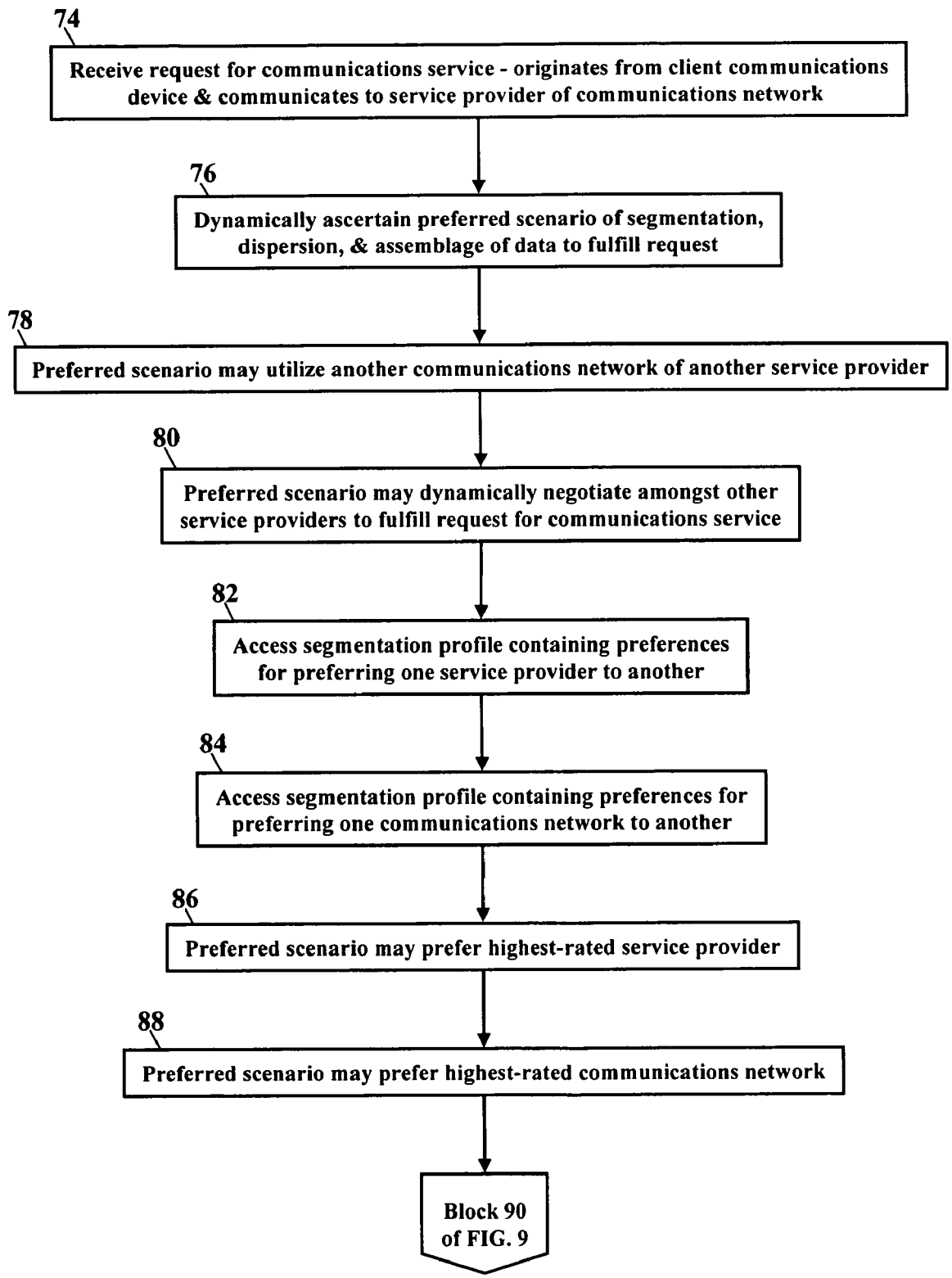
FIGS. 8 and 9 are flowcharts illustrating a method of providing communications service.

FIG. 8 is a flowchart illustrating a method of providing communications services. A request for communications service is received (Block 74). The request for communications service originates from a client communications device and communicates to a service provider of a communications network. A preferred scenario of segmentation, dispersion, and assemblage of data is dynamically ascertained to fulfill the request (Block 76). The preferred scenario may utilize another communications network of another service provider (Block 78). The preferred scenario may dynamically negotiate amongst other service providers to fulfill the request for communications service (Block 80). The preferred scenario may access a segmentation profile stored in memory. The segmentation profile may contain preferences for preferring one service provider to another service provider (Block 82) and/or preferences for preferring one communications network to another communications network (Block 84). The preferred scenario may prefer a highest-rated service provider (Block 86) and/or a highest-rated communications network (Block 88) to provide the communications service.

Figure 9:
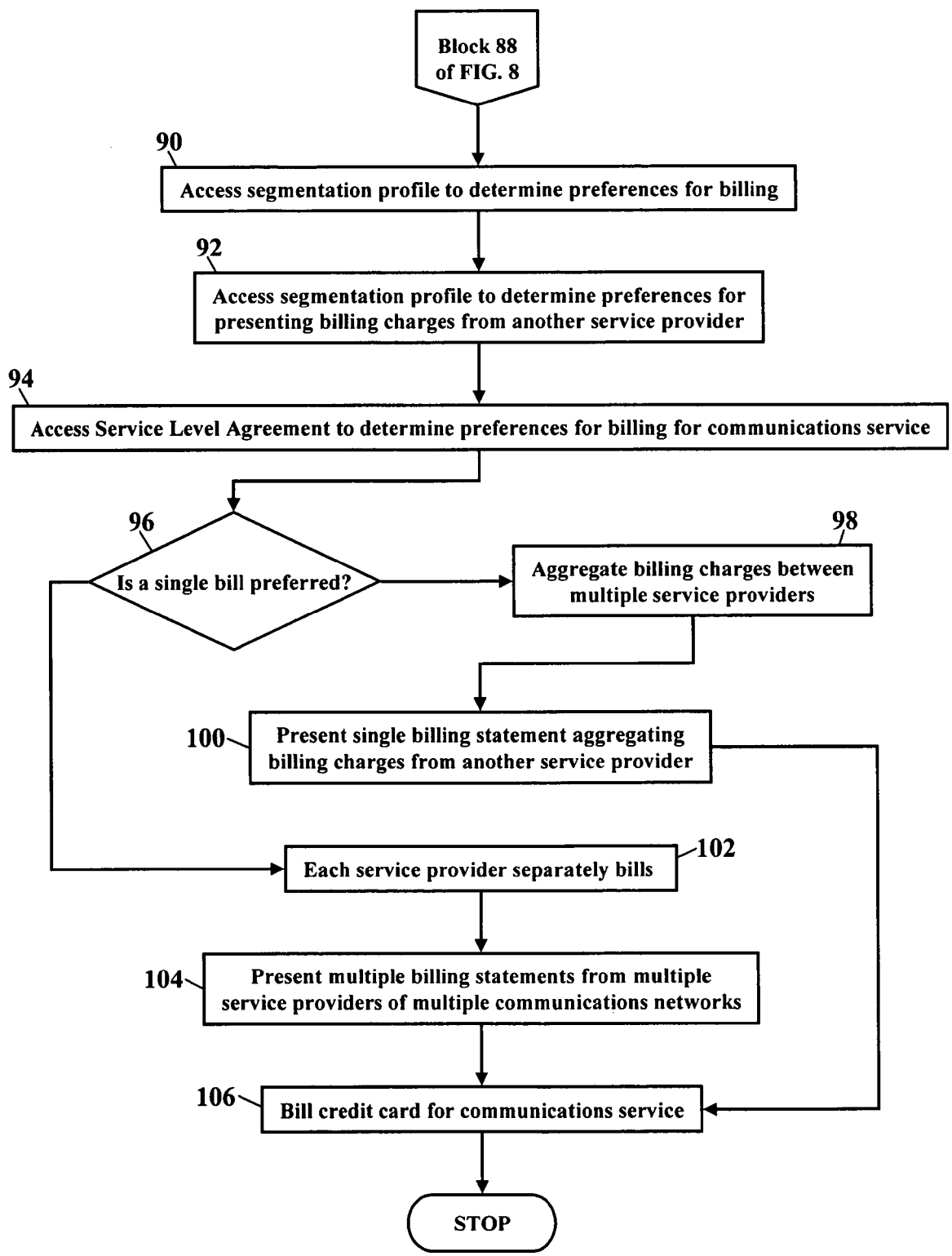

The flowchart continues with FIG. 9. Once the preferred scenario is known, then billing is determined. The segmentation profile is accessed (Block 90) to determine any preferences for billing for the communications service. The segmentation profile may also be accessed for preferences for presenting billing charges from another service provider of another communications network (Block 92). The Service Level Agreement is also accessed (Block 94) to determine any preferences for billing for the communications service. If a single bill is preferred (Block 96), then billing charges are aggregated between multiple service providers of multiple communications networks (Block 98). A single billing statement is also presented (Block 100), and the single billing statement aggregates billing charges from another service provider of another communications network. If, however, individual billings are preferred (Block 100), each service provider separately bills the user (Block 102). Each service provider, then, could submit "micro-bills." Each micro-bill reflects each service provider's portion for providing the requested communications service. The micro-bill may be pennies, or even fractions of a penny, for each service provider's contribution or portion of the requested communications service. When individual billings are preferred, multiple billing statements, from multiple service providers of multiple communications networks, are presented (Block 104). Whether a single billing statement is preferred, or whether individual "micro-bills" are preferred, a credit card may be billed for the communications service (Block 106).

Figure 10:
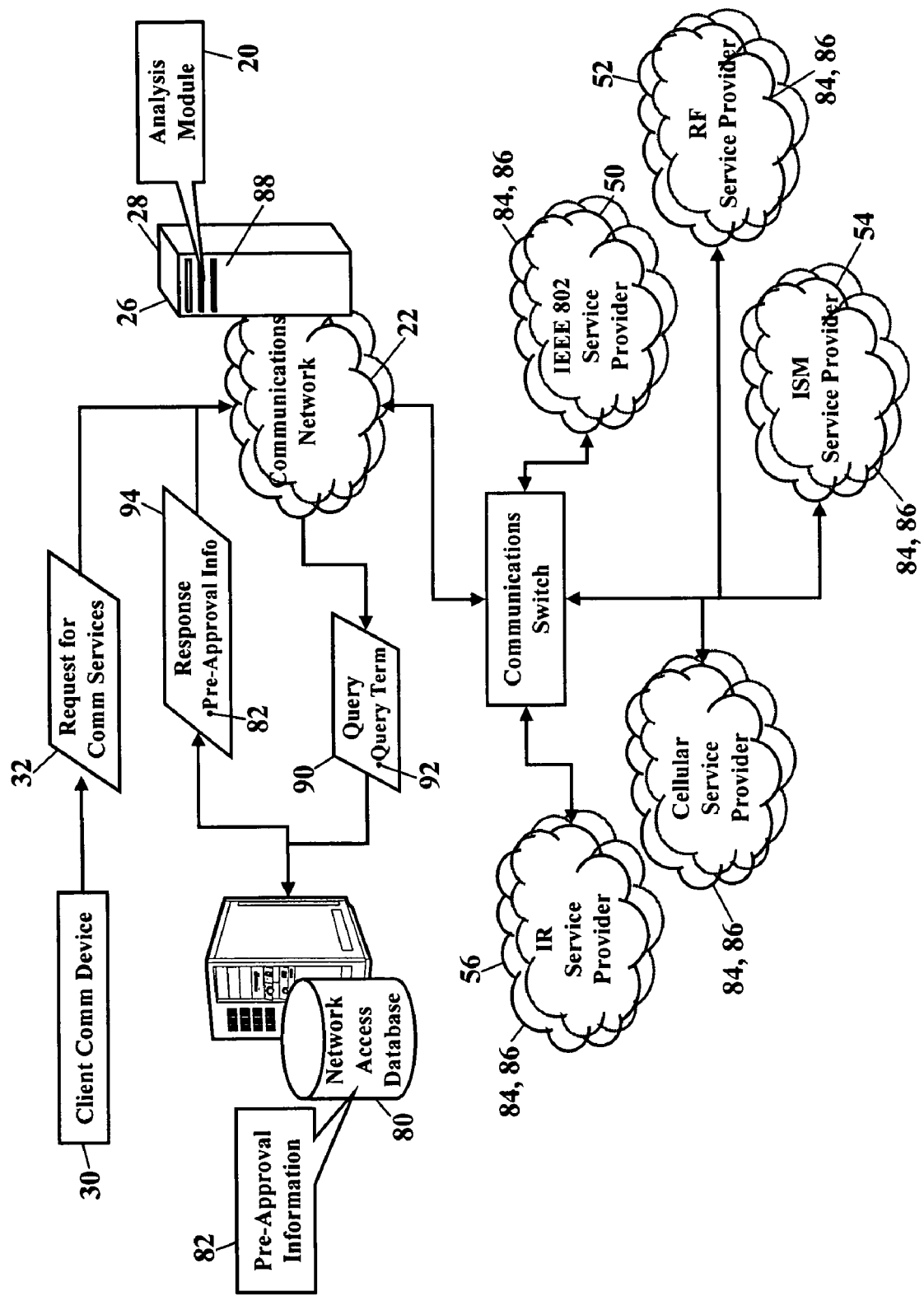
FIG. 10 is a schematic illustrating a process for pre-approved access, according to more exemplary embodiments.

FIG. 10 is a schematic illustrating a process for pre-approved access, according to more exemplary embodiments. When the client communications device 30 sends the request 32 for communications service, the analysis module 20 ascertains the preferred scenario that fulfills the request. The preferred scenario, as above explained, reflects the best-available routing, quality, performance, and/or pricing, that satisfies the requested communications service(s). When the analysis module 20 constructs the preferred scenario, the analysis module 20 considers any competing communications networks, and/or any competing service providers, that may satisfy the requested communications service(s). The analysis module 20 may evaluate one, more, or all service providers that offer access to various communications services and/or networks. The analysis module 20, therefore, selects the preferred scenario, even if that preferred scenario utilizes a competing service provider or a competing communications network.

According to an exemplary embodiment, the analysis module 20 may be configurable, e.g., by a user. A user of the analysis module 20 may establish constraints, parameters, rules, and/or conditions that determine what service provider(s) and/or what communications network(s) best satisfy the user's request 32 for communications service. As the analysis module 20 evaluates service providers and/or communications networks, the analysis module 20 uses these user-configurable values to select the preferred scenario. An equation or weighting determines the preferred scenario, based on the user's configuration. The user, for example, may be cost-conscious, so the user may configure the analysis module 20 to always choose the cheapest scenario. If the user is time-sensitive, the analysis module 20 may select the quickest delivery time, the highest bandwidth or bitrate of service, or both. The user may have a history of trust, or an allegiance, to a particular service provider or a particular communications network, so the may configure the analysis module 20 to always prefer a particular provider or network. If the user desires higher quality service, the analysis module 20 may create the preferred scenario to maintain quality of service. Whatever the objective(s), the user may configure the analysis module 20 to achieve that objective.

The analysis module 20 may also present alternatives. As paragraph [0017] explained, the analysis module 20 may also create alternative scenarios. These alternative scenarios could include suggestions for cheaper rates, for better performance, for higher quality communications services, or for any other objective. If, for example, the user's communications needs are not immediate, the analysis module 20 might suggest an alternative time/date when higher quality or lower rates are available. Even if cost is important, the analysis module 20 might suggest a more expensive bandwidth connection to reduce transmission times. The analysis module 20 may recommend a more expensive service provider, knowing that an hourly or monthly aggregate minimum will be achieved for an overall savings. The analysis module 20 may even consider promotions offered by a service provider. The analysis module 20, then, may create alternative scenarios that also satisfy the user's communications needs.

The analysis module 20 may autonomously operate or upon command. That is, the user may configure the analysis module 20 to always automatically select the preferred scenario. The analysis module, however, may be alternatively configured to present the alternative scenarios and await the user's command or selection. The analysis module 20, for example, may indicate the preferred scenario with an icon (such as a star), a bar graph, and/or with emphasized fonts or colors. The analysis module 20 may additionally or alternatively present a rank ordering of scenarios, perhaps with the preferred scenario ranked first. The user may also be presented with visual tabs or buttons that allow the user to change the criterion upon which the ranking is based. For example, the scenarios presented to the user may be based on best price, yet if the user selects the button or tab "Highest Bandwidth," or "Best Connectivity," the analysis module 20 may, based on the user command, re-select, reorder, and/or re-display the scenarios with indictors or rankings based on the user selection. In addition to tabs or buttons, the user may also be presented with check boxes or radial selection holes associated with determining criteria, wherein the user can select one or more criteria upon which the analysis module 20 may take into account when determining scenarios. The user would then select the scenario that best suits the user's needs or desires. If no selection is made within a predetermined period of time, the analysis module 20 would then make a selection on behalf of the user.

As the analysis module 20 develops the preferred scenario, the analysis module 20 may consult a network access database 80. The network access database 80 stores pre-approval information 82 for accessing multiple services providers and/or their respective communications networks. If a user associated with the client communications device is pre-approved to access a service provider's communications network(s), then that pre-approval is documented in the network access database 80. The network access database 80 stores a look-up table, mapping, or other means of associating the user, or the user's client communications device, to a listing of service providers and/or communications networks. If the user is pre-approved to access a services provider and/or a communications network, the network access database 80 will indicate such pre-approval.

Exemplary embodiments include any pre-payment scheme. When a service provider pre-approves the user, that pre-approval may be based on creditworthiness, account balance(s), or direct payment. A service provider, for example, may require a minimum credit score to grant pre-approved access. If the user has a reliable payment history, the service provider may grant pre-approved access. If the user maintains a pre-paid account, access may be pre-approved. The service provider could also grant pre-approved access based on the user's banking records and/or banking balances. The user may even be granted pre-approved access based on pre-approved charges to a credit card or a debited bank account.

Exemplary embodiments may track pre-payments. When the user has a pre-paid account balance, that balance information may be maintained by a single service provider, by each service provider, or by a third party vendor. A single service provider, for example, could aggregate charges from multiple service providers and present the user with a single billing statement. This single service provider may also maintain a pre-paid database that stores an account balance for each pre-paid user. As the analysis module 20 fulfills the user's request for communications services, the analysis module 20 instructs the pre-paid database to deduct the costs of those services from the user's pre-paid account. Because the pre-paid database is maintained by one service provider, that service provider receives billing information from any other service provider. The user maintains one pre-paid account, and all charges are deducted from that account. This solution is thus simple for the user and simple for the service providers. A third party vendor may also maintain this pre-paid database on behalf of all the service providers, thus providing a similar, simple solution.

Each individual service provider, alternatively, may maintain their own pre-paid database. Here, each service provider maintains a pre-paid account for the user. The user, in other words, has a pre-paid account with BELLSOUTH®, VERIZON®, CINGULAR®, and any other service provider. This solution, then, may force the user to maintain multiple pre-paid accounts with multiple service providers. As each service provider provides communications services, each service provider debits or deducts a billing charge from the user's pre-paid account (see paragraph [0024] and its discussion of "micro-bills"). Multiple pre-paid accounts, however, may be an inconvenience to the user and to the service provider. Moreover, if a pre-paid account has a zero balance, then that corresponding service provider may decline access until a sufficient balance is restored.

FIG. 10 illustrates an example. As the analysis module 20 develops the preferred scenario, suppose multiple service providers are available to satisfy the request. FIG. 10, for example, illustrates that multiple service providers 84, and/or multiple communications networks 86, may be used to satisfy the request 32 for communications service. Yet the analysis module 20 recognizes that the user of the client communications device 30 may not be authorized to access every multiple service provider 84 and/or each of the multiple communications networks 86. The analysis module 20, then, instructs a processor 88 to query the network access database 80. The network access database 80 stores information describing what service provider, and/or what communications network, provides pre-approved access. The processor 88 sends a query 90 via any of the communications networks. The query 90, for simplicity, is shown communicating via the communications network 22. The query 90, however, may communicate via any of the multiple service providers 94 and/or any of the multiple communications networks 86. The query 90 includes a query term 92 that identifies the user and/or the client communications device. When the query 90 is received, the network access database 80 retrieves the pre-approval information 82. The pre-approval information 82 describes the service providers, and/or the communications networks, to which access is authorized.

The analysis module 20 then obtains those pre-approvals. The network access database 80 sends a response 94 to the query 90. The response 94 includes the pre-approval information 82 describing the service providers, and/or the communications networks, to which the user has pre-approved access. The response 94 communicates via the data network 38 to the analysis module 20. The analysis module 20 then ascertains the preferred scenario of segmentation, dispersion, and assemblage of electronic data to fulfill the request. The analysis module 20, however, may only negotiate amongst those service providers, and/or those communications networks, to which the client communications device has pre-approved access. The user could be denied access, and the user's request for communications service may result in an error message. The network access database 80, then, helps the analysis module 20 ensure that the preferred scenario does not include inaccessible networks.

Another example illustrates pre-approved access. A user in a metropolitan area may have a selection of service providers and communications networks. Suppose, for example, at any one time the user may select from multiple service providers, such as CINGULAR®, NEXTEL®, and VERIZON®. Suppose also that the user is pre-approved by CINGULAR®, NEXTEL®, and VERIZON®. That is, CINGULAR®, NEXTEL®, and VERIZON® all permit the user to access their services and/or networks. When the analysis module 20 ascertains a preferred scenario to fulfill the user's request, the analysis module 20 evaluates the services offered by CINGULAR®, NEXTEL®, and VERIZON®. The analysis module 20 then selects a scenario (e.g., the preferred scenario) that best provides the requested communications service(s).

Now, even if the user's geographic position should change, the user may still retain pre-approved access. Even if the user moves, travels, or roams, the user may subsequently retain that pre-approved status in any other geographic area. Suppose the user travels to a new geographic area or location, such that the user may now be served by CINGULAR®, NEXTEL®, VERIZON®, and METRO PCS®. Even though the user has moved to a new geographic area or location, the user is still pre-approved to use CINGULAR®, NEXTEL®, and VERIZON®. If the user is not pre-approved to access METRO PCS®, the following paragraphs further explain how the user may obtain pre-approval to use the METRO PCS® network.

Figure 11:
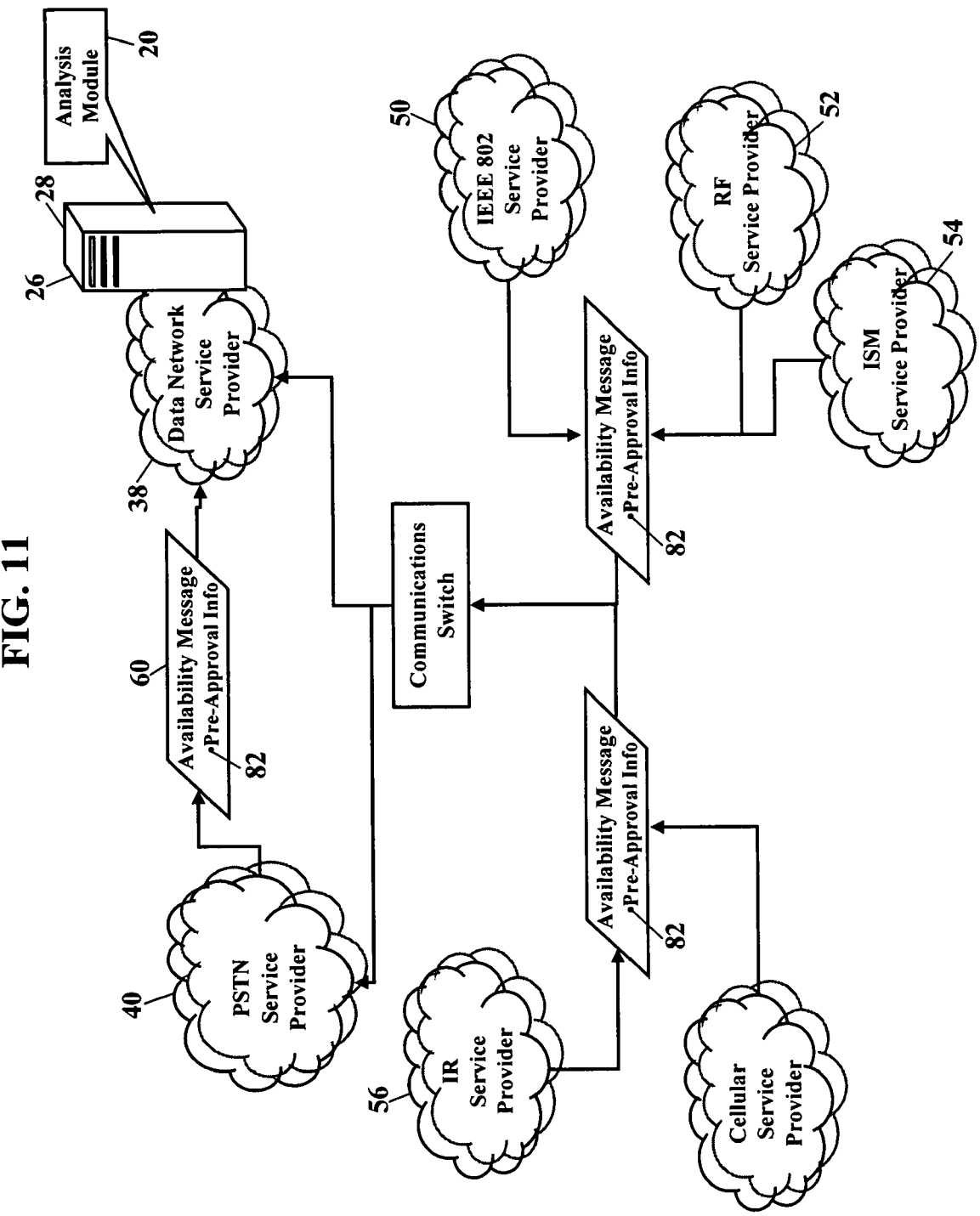
FIG. 11 is a schematic further illustrating the pre-approval process, according to still more exemplary embodiments.

FIG. 11 is a schematic further illustrating the pre-approval process, according to still more exemplary embodiments. Here the analysis module 20 utilizes an optional mechanism to determine pre-approvals. Recall the analysis module 20 receives the availability message 60 from all the service providers or from all the communications networks that could fulfill the user's request (as FIGS. 2-5 explained). Each availability message 60 describes what routing paths are immediately available, what bandwidth is immediately available, and/or the capabilities of any edge assemblers (as previously explained). Each availability message 60, however, may also include the pre-approval information 82. That is, each availability message 60 may additionally or alternatively describe the service providers, and/or the communications networks, to which the user has pre-approved access. The analysis module 20 then ascertains the preferred scenario, utilizing those service providers, and/or those communications networks, to which the client communications device has pre-approved access.

Figure 12:
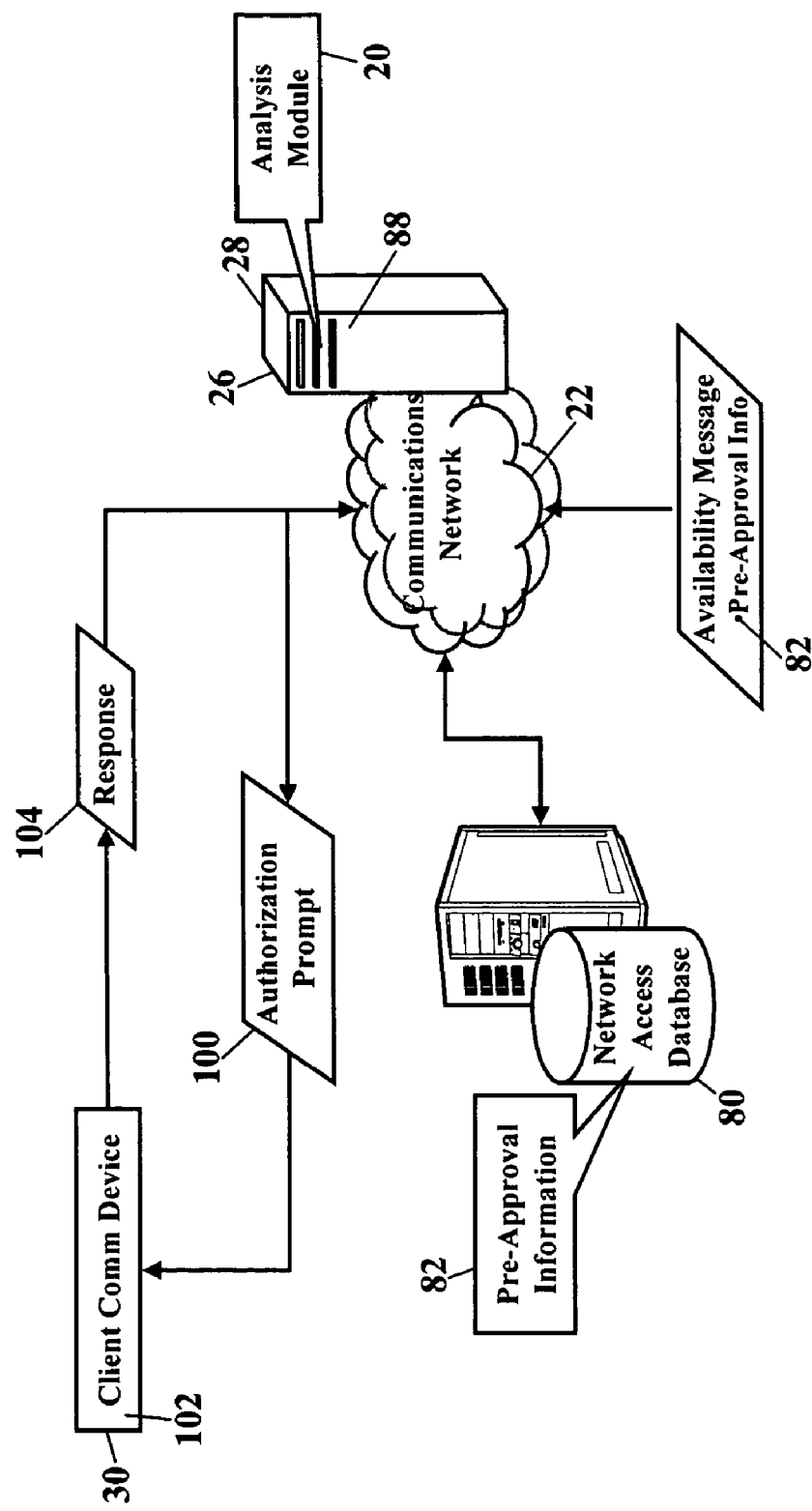
FIGS. 12 and 13 are schematics illustrating a process for obtaining authorization, according to additional exemplary embodiments.
Figure 13:
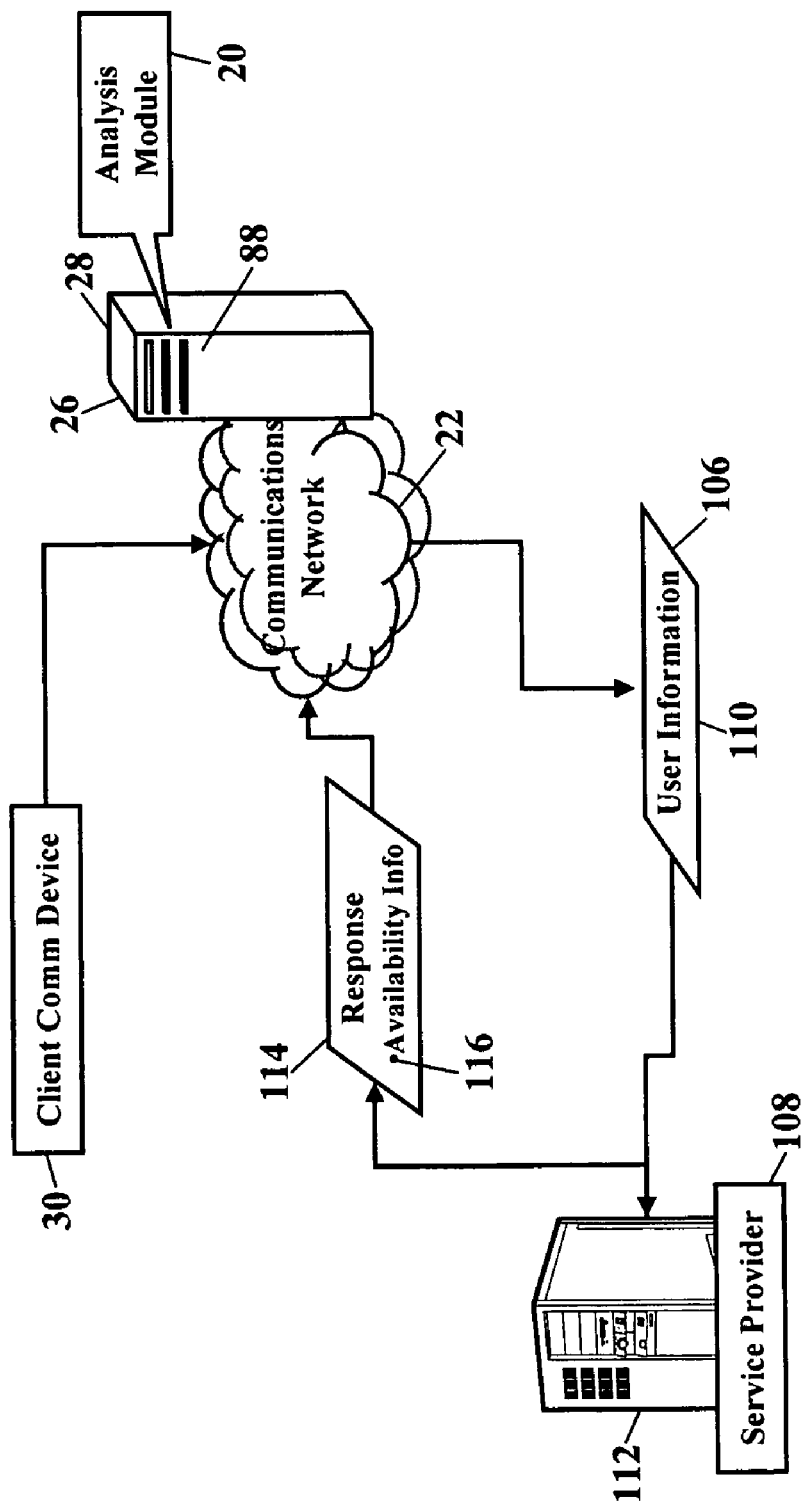

FIGS. 12 and 13 are schematics illustrating a process for obtaining authorization, according to additional exemplary embodiments. If the user not be authorized to access a service provider and/or a communications network, here the analysis module 20 may prompt the user to obtain that authorization. As the above paragraphs explained, the analysis module 20 may consult the network access database 80 to determine whether the user is pre-approved to access a service provider and/or a communications network. The analysis module 20 may additionally or alternatively receive the pre-approval information 82 from each availability message 60. However the pre-approval information is obtained, the analysis module 20 now knows what service providers and/or what networks may be used when developing the preferred scenario. Conversely, the analysis module 20 also knows which service providers and/or which communications networks do not provide access to the user. The network access database 80, for example, may indicate the user is not authorized to access a particular service provider and/or a particular communications network. Similarly, one of the availability messages 60 may include information indicating or stating the user is not authorized to use a particular service provider and/or a particular communications network.

Here, then, the analysis module 20 may prompt to obtain such authorization. The analysis module 20 strives to include every service provider and/or every communications network in that determination. If a service provider or a communications network does not participate in that determination, the analysis module 20 cannot be assured that the user obtains the best quality, performance, and/or pricing comparison. So, when the user (or the user's client communications device 30) is not pre-approved to access a particular service provider and/or a particular communications network, then the analysis module 20 prompts for authorization. The analysis module 20 sends an authorization prompt 100. The authorization prompt 100 is shown communicating to the client communications device 30 via the communications network 22 (the authorization prompt 100, however, may communicate via any service provider(s) and/or any communications network (s)). The authorization prompt 100 is visually and/or audibly presented by a client processor 102 operating in the client communications device 30. The authorization prompt 100 prompts the user to authorize a pre-approval process with the particular service provider.

The analysis module receives a response 104. The response 104 communicates from the client communications device 30 via the communications network 22. The response 104 indicates whether the user authorizes the pre-approval process. If the response 104 is negative, then the user declines to undergo a pre-approval process with the particular service provider or the particular communications network. When, however, the response 104 is affirmative, then the analysis module 20 initializes the pre-approval process.

FIG. 13 illustrates user information 106. Because the user authorizes the pre-approval process, the analysis module 20 sends the user information 106 to the particular service provider 108. Recall, the analysis module 20 knows that the particular service provider 108 does not provide access to the user. The analysis module 20, then, sends the user information 106 to persuade the particular service provider 108 into authorizing the user. The user information 106 communicates as a message 110 to a server 112 associated with the particular service provider 108. The user information 106 may include any information the user authorizes the analysis module 20 to release. The user information 106, for example, may include the user's name and address. The user information may additionally or alternatively include age, income, sex, and any other demographic data. The user information may additionally or alternatively include a Social Security Number, account number, telephone number, or other identification number. The user information may additionally or alternatively include a credit card number.

The analysis module 20 receives a response 114. The response 114 indicates whether the particular service provider 108 will pre-approve access for the user. If the particular service provider 108 declines to pre-approve the user, then the response 114 is negative. The analysis module 20 then constructs the preferred scenario without considering any participation, contribution, or availability of the particular service provider 108. If, however, the response 114 is affirmative, the response 114 may include availability information 116. The availability information 116 (like the availability message 60) describes what routing paths are immediately available, what bandwidth is immediately available, and/or the capabilities of any edge assemblers. The analysis module 20 then ascertains the preferred scenario, now utilizing whatever contribution the particular service provider 108 may offer.

Figure 14:
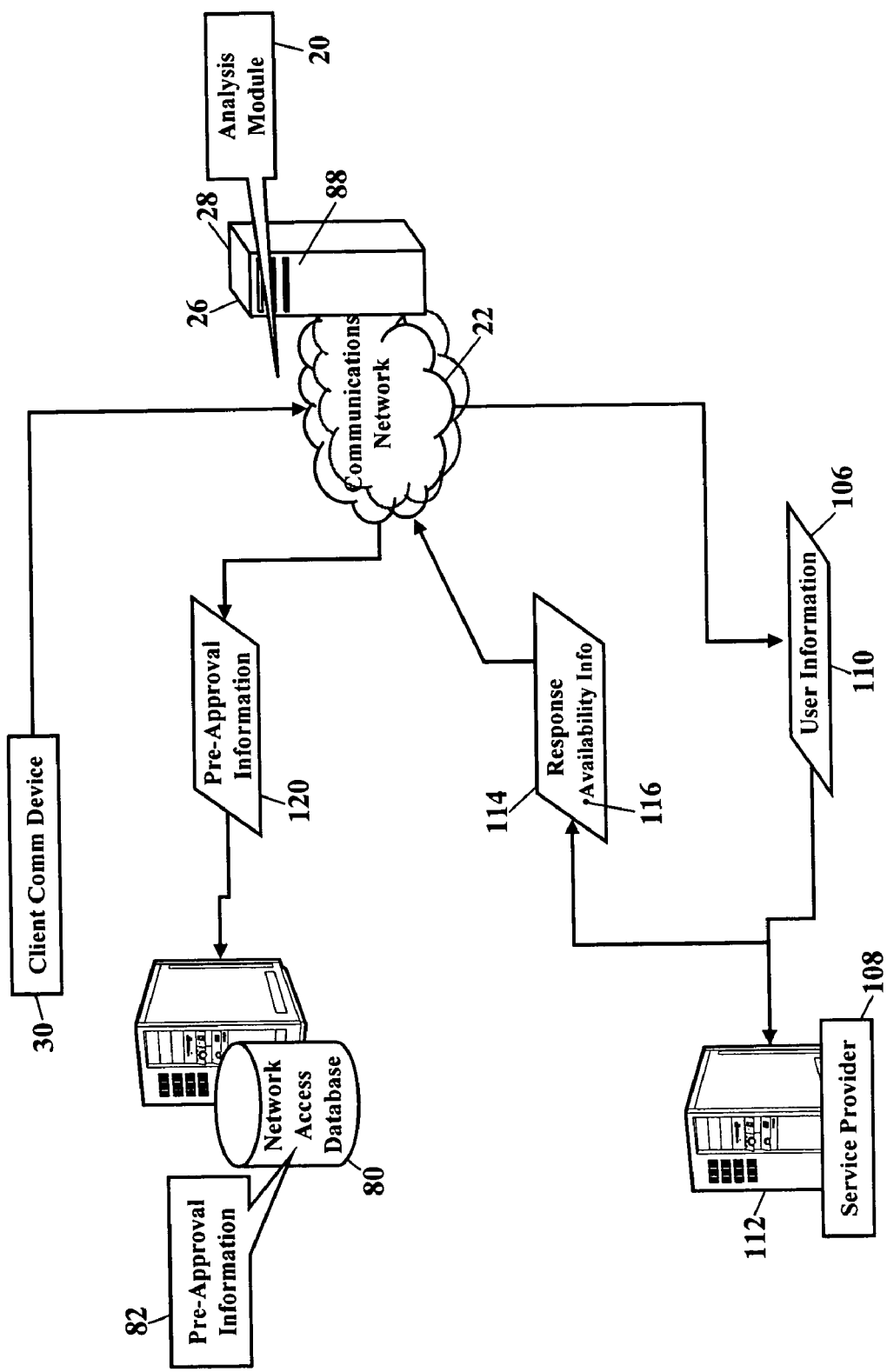
FIG. 14 is a schematic illustrating an update to the network access database 80, according to exemplary embodiments.

FIG. 14 is a schematic illustrating an update to the network access database 80, according to exemplary embodiments. Recall that the network access database 80 stores pre-approval information 82. If the user (associated with the client communications device 30) is pre-approved to access a service provider and/or a communications network, then that pre-approval is documented in the network access database 80. Because the particular service provider 108 has just pre-approved the user, the network access database 80 is updated to reflect that recent pre-approval. The network access database 80 receives a pre-approval message 120. The pre-approval message 120 may communicate from the server 112 associated with the particular service provider 108, and/or the pre-approval message 120 may be sent from the analysis module 20. The pre-approval message 120 updates the network access database 80 to associate the user as being pre-approved with the particular service provider 108.

Exemplary embodiments may also include security measures. Although the user may be pre-approved to access a service provider and/or a communications network, security could be a concern. Suppose, for example, the user's communications device (shown as reference numeral 30) is stolen. If the user is pre-approved for access, a thief could abuse this access and run up significant charges. Exemplary embodiments, then, may require authentication from the user, even though pre-approval exists. The analysis module 20, for example, may prompt the user (at the client communications device 30) for a username and password. The analysis module 20 may send this prompt before creating the preferred scenario. If the user cannot authenticate, then the analysis module 20 would not process the request for communications services. Each service provider and/or communications network may additionally, alternatively, or individually require a username and password to grant that pre-approved access.

The analysis module (shown as reference numeral 20) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the analysis module to be easily disseminated. A computer program product for providing communications services includes the analysis module stored on the computer-readable medium. The analysis module receives a request for communications service. The request for communications service originates from a client communications device and is communicated to a service provider of a communications network. The analysis module dynamically ascertains a preferred scenario of segmentation, dispersion, and assemblage of electronic data to fulfill the request. The analysis module then bills for the communications service.

The analysis module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of providing communications services, comprising:
    receiving a request at a processor for communications service from a client communications device;
    querying a database in memory that stores pre-approved access to multiple service providers;
    dynamically ascertaining by the processor a preferred scenario of segmentation, dispersion, and assemblage of electronic data to fulfill the request;
    determining a subcontracted processing service is required from at least one of the multiple service providers;
    grouping together packets of data that require the subcontracted processing service;
    subcontracting the grouped together packets of data to the at least one of the multiple service providers to receive the subcontracted processing service; and
    receiving a subcontracted result of the subcontracted processing service.

2. The method according to claim 1, further comprising dynamically negotiating amongst only the multiple service providers to which the client communications device has pre-approved access.

3. The method according to claim 1, further comprising dynamically negotiating with at least one of the multiple service providers to which the client communications device has pre-approved access.

4. The method according to claim 1, wherein if the client communications device is not pre-approved to access a particular service provider, then further comprising prompting the client communications device to authorize a pre-approval process with the particular service provider.

5. The method according to claim 4, wherein if authorization is received, then further comprising communicating user information to the particular service provider to pre-approve access for the client communications device.

6. The method according to claim 5, wherein after the particular service provider pre-approves the user, then further comprising ascertaining the preferred scenario of segmentation, dispersion, and assemblage of electronic data to fulfill the request.

7. The method according to claim 1, further comprising billing a user associated with the client communications device for the communications service.

8. A system, comprising:
    an analysis module stored in memory; and
    a processor communicating with the memory,
    wherein the processor receives a request for communications service from a client communications device,
    the processor queries a database storing pre-approved access to multiple service providers,
    the processor dynamically ascertains a preferred scenario of segmentation, dispersion, and assemblage of electronic data to fulfill the request,
    the processor determines a subcontracted processing service is required from at least one of the multiple service providers,
    the processor groups together packets of data that require the subcontracted processing service,
    the processor subcontracts the grouped together packets of data to at least one of the multiple service providers to receive the subcontracted processing service, and
    the processor receives a subcontracted result of the subcontracted processing service.

9. The system according to claim 8, wherein the processor dynamically negotiates amongst only the multiple service providers to which the client communications device has pre-approved access.

10. The system according to claim 8, wherein the processor dynamically negotiates with at least one of the multiple service providers to which the client communications device has pre-approved access.

11. The system according to claim 8, wherein if the client communications device is not pre-approved to access a particular service provider, then the processor sends a prompt to the client communications device to authorize a pre-approval process with the particular service provider.

12. The system according to claim 11, wherein if authorization is received, then the processor communicates user information to the particular service provider to pre-approve access for the client communications device.

13. The system according to claim 12, wherein after the particular service provider pre-approves the user, then the processor ascertains the preferred scenario of segmentation, dispersion, and assemblage of electronic data to fulfill the request.

14. The system according to claim 8, wherein the processor bills a user associated with the client communications device for the communications service.

15. A computer readable medium storing processor executable instructions for performing a method, the method comprising:

receiving a request for communications service from a client communications device;

querying a database storing pre-approved access to multiple service providers;

dynamically ascertaining a preferred scenario of segmentation, dispersion, and assemblage of electronic data to fulfill the request;

determining a subcontracted processing service is required from at least one of the multiple service providers;

grouping together packets of data that require the subcontracted processing service;

subcontracting the grouped together packets of data to at least one of the multiple service providers to receive the subcontracted processing service; and receiving a subcontracted result of the subcontracted processing service.

16. The computer readable medium according to claim 15, further comprising instructions for dynamically negotiating amongst only the multiple service providers to which the client communications device has pre-approved access.

17. The computer readable medium according to claim 15, further comprising instructions for dynamically negotiating with at least one of the multiple service providers to which the client communications device has pre-approved access.

18. The computer readable medium according to claim 15, wherein if the client communications device is not pre-approved to access a particular service provider, then further comprising instructions for prompting the client communications device to authorize a pre-approval process with the particular service provider.

19. The computer readable medium according to claim 18, wherein if authorization is received, then further comprising instructions for communicating user information to the particular service provider to pre-approve access for the client communications device.

20. The A computer readable medium according to claim 19, further comprising instructions for wherein after the particular service provider pre-approves the user, then the processor ascertains the preferred scenario of segmentation, dispersion, and assemblage of electronic data to fulfill the request.

* * * * *